P. H. SCHLUETER.
COOKING VESSEL.
APPLICATION FILED SEPT. 5, 1913.
1,135,210.
Patented Apr. 13, 1915.
2 SHEETS—SHEET 2.
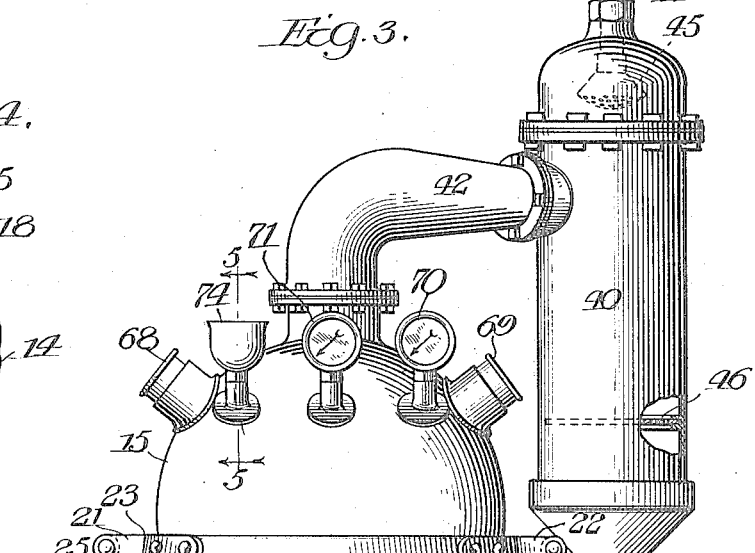
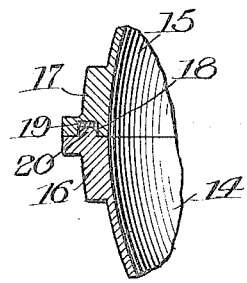
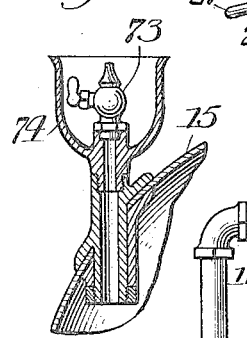
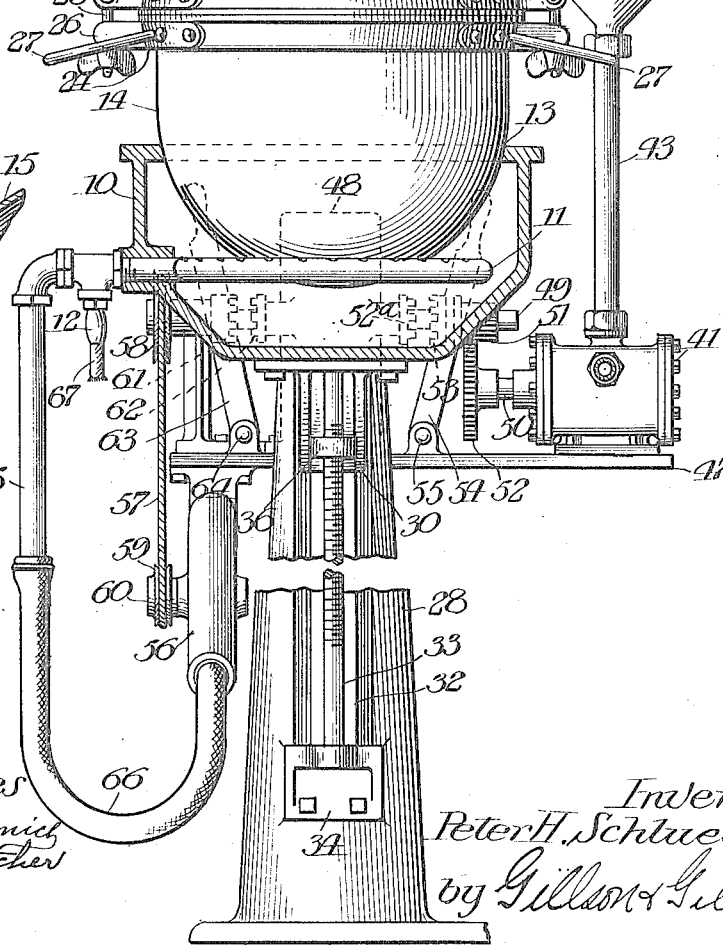
Witnesses
C. M. Wermich
E. M. Hatcher
Inventor
Peter H. Schlueter
by Gillson & Gillson
Attys.

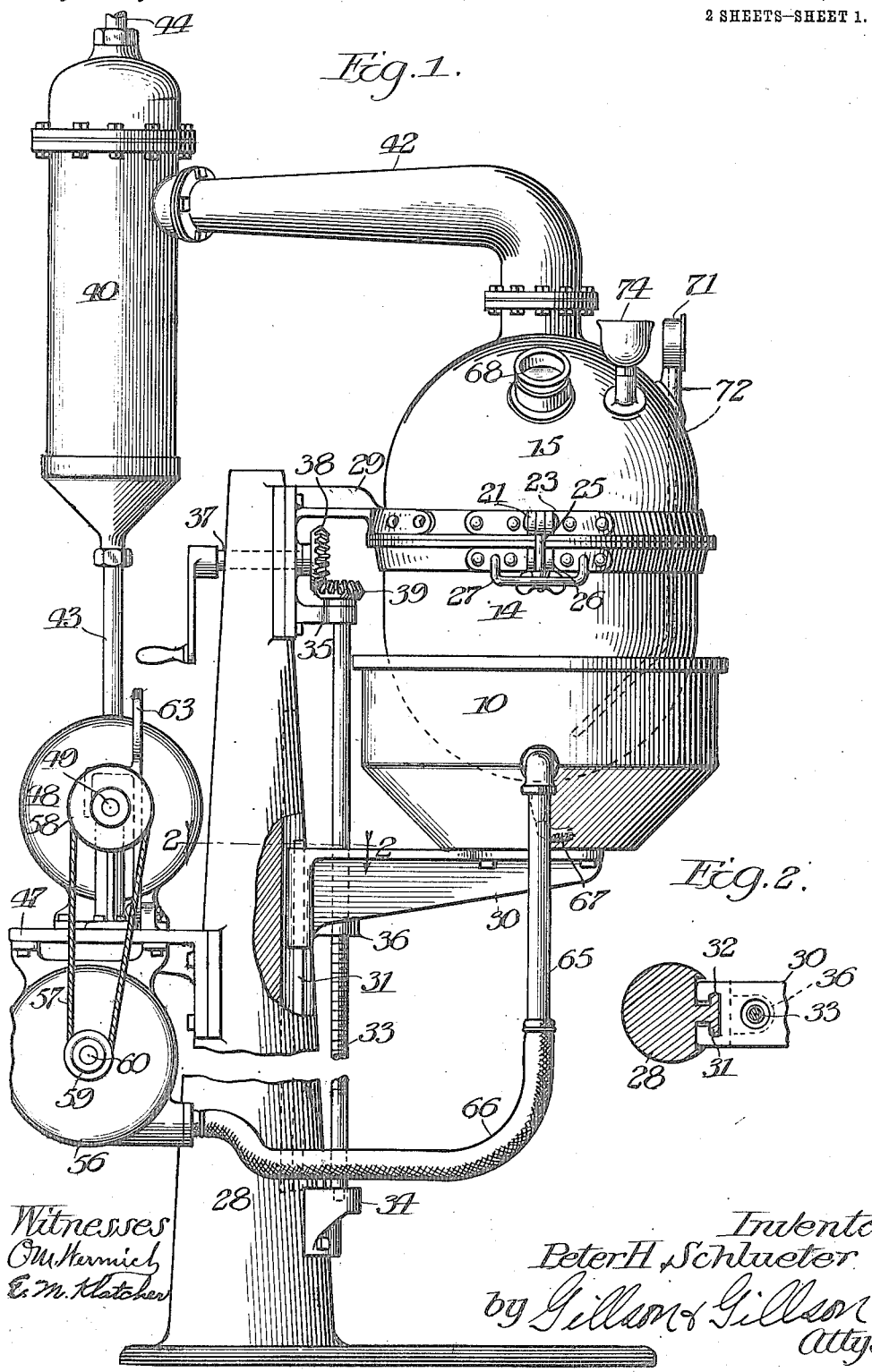

UNITED STATES PATENT OFFICE.

PETER H. SCHLUETER, OF CHICAGO, ILLINOIS.

COOKING VESSEL.

1,135,210. Specification of Letters Patent. Patented Apr. 13, 1915.

Application filed September 5, 1913. Serial No. 788,256.

*To all whom it may concern:*

Be it known that I, PETER H. SCHLUETER, a citizen of the United States, and resident of Chicago, county of Cook, and State of Illinois, have invented certain new and useful Improvements in Cooking Vessels, of which the following is a specification, and which are illustrated in the accompanying drawings, forming a part thereof.

The invention relates to cooking appliance and more particularly to a kettle adapted to be used over the fire in connection with the cooking of certain forms of candy at reduced pressure.

The object of the invention is to provide a cooking device which shall be efficient in operation and shall be adapted for use in situations where steam at high pressure is not readily available.

In the accompanying drawings, Figure 1 is a side elevation of the apparatus embodying the improvements provided by the invention, some of the parts being broken away; Fig. 2 is a detail sectional view taken on the line 2—2 of Fig. 1; Fig. 3 is a front elevation of the apparatus, some of the parts being shown in section, and Figs. 4 and 5 are detail sectional views, Fig. 4 showing a form of joint which may be used between the parts of the kettle, and Fig. 5 being taken on the line 5—5 of Fig. 3.

In carrying out the invention a furnace 10, having a burner 11 adapted to be supplied with gas, as through a pipe 12, is preferably employed. As shown, this furnace is of a form adapted to provide a seat 13 for a bowl-shaped kettle 14. In order that material which is required to be cooked at a reduced pressure may be treated in the kettle 14, a hood 15 is provided. As shown, the rims 16, 17, of the kettle 14 and hood 15 are constructed for sealed engagement. To this end the rim 17 of the hood 15 is provided with an annular groove 18, into which a packing 19 is fitted, and the rim 16 of the kettle 14 is provided with an annular bead 20 adapted to enter the groove 18. Clamps, as 21 and 22, are then employed for binding the rims of the kettle 14 and hood 15 together. As shown, each clamp comprises a pair of brackets 23, 24, provided on the kettle and hood, respectively, the bracket 23 being supplied with a swinging clamping bolt 25 and the bracket 24 with a laterally open socket 26 for receiving the bolt. Handles, as 27, for lifting the kettle 14 are mounted on each of the brackets 24.

In order that the kettle 14 and hood 15 may be fitted together while the kettle is being heated by the furnace 10, the furnace and hood 15 are desirably mounted for relative movement. As shown, the hood 15 is supported in fixed position and the furnace 10 is vertically movable. Preferably a standard 28 is provided for supporting all of the parts of the apparatus.

When the hood, 15, is supported in fixed position, and the furnace 10, is vertically movable, as shown, the standard 28 is provided with a fixed bracket 29 for supporting the hood 15 and with a vertically movable bracket 30, for supporting the furnace. The bracket 30 is conveniently mounted for vertical movement on the standard 28 by providing a rib, 31, upon one side of the standard which is of T-shape in cross section and by forming the inner end of the bracket 30 with a T slot, 32, adapted to receive the rib 31. Raising the bracket 30 serves to bring the kettle 14 into position for connection with the hood 15, and lowering the bracket 30 serves to separate the kettle 14 from the hood. In the latter position, access may be had to the interior of the kettle and the kettle may be removed from the furnace for the purpose of discharging its contents.

Any convenient mechanism may be employed for raising and lowering the bracket 30. As shown, an upright screw shaft, 33, is provided. This shaft is journaled adjacent its opposite ends in brackets 34 and 35 fixed upon the standard 28 and has threaded engagement with a stud 36 formed on the bracket 30. A crank shaft 37 is conveniently employed for turning the screw shaft 33. This crank shaft extends through and is journaled in the higher end of the standard 28, and is operatively connected with the screw shaft 33 by beveled gears 38 and 39, one mounted on the crank shaft and the other on the screw shaft 33.

Suitable vacuum creating means is connected with the hood 15. As shown, this vacuum creating means comprises a condenser 40, and rotary vacuum pump 41. The condenser 40 conveniently takes the form of an upright drum, the chamber of the drum being in communication with that of the hood through an elbow pipe 42, which is connected to the top of the hood and enters the side of the drum. The lower end of the drum, 40, is connected with the vacuum pump 41 through a pipe 43.

Cooling water is preferably supplied to the chamber of the drum. As shown, a water supply pipe, 44, enters the drum 40, at its top and is provided with a spray nozzle, 45, upon its inner end. For interrupting the travel of the water discharged by the nozzle, 45, through the drum and thereby insuring its thorough intermixture with the vapors which enter the drum through the elbow, 42, a foraminous baffle plate, 46, is set across the chamber of the drum intermediate its ends.

The vacuum pump, 41, is conveniently mounted upon a shelf, 47, which is carried by the standard. A motor, 48, for driving the pump is also desirably mounted on the shelf, 47. The spindle 49, of the motor is shown as being operatively connected with the spindle, 50, of the vacuum pump 41, by speed reducing gears, 51 and 52. Preferably the gear 51 is slidingly mounted on the spindle 49 of the motor and coöperating clutch members 52ª, 53, one fixed on the motor spindle 49 and the other formed integral with the gear 51 are provided for permitting the gear to be rotatably connected or disconnected from the spindle. A hand lever 54, is provided for sliding the gear 51 to engage or disengage the clutch members 52ª, 53. As shown, the hand lever 54 is pivotally attached to the shelf 47 at 55. The motor 48 may also conveniently be employed to operate a blower 56 for supplying air to the burner 11. As shown, the blower 56, is secured against the under side of the shelf 47 and a driving belt 57 turns over pulleys 58 and 59, one mounted on the motor spindle 49 and the other on the spindle 60 of the blower. Coöperating clutch members 61, 62, similar to the clutch members 52ª, 53, and one formed integral with the pulley 58 and the other fixed upon the motor spindle 49, are provided for controlling the operation of the blower. As shown, the pulley 58 and clutch member 61 are slidingly mounted upon the spindle 49 of the motor, and a hand lever 63 is provided for sliding these parts to bring the clutch members 61, 62 into or out of engagement. The hand lever 63 is also conveniently supported by the shelf 47, as by being pivotally secured thereto at 64. A pipe 65 having a flexible section 66 serves for connecting the blower 56 with the burner 11. In order that vertical movement of the furnace 10 may not interfere with the operation of the burner 11, the gas supply pipe, 12, also has a flexible section, as 67. Hand levers 54 and 63 serve for independently controlling the operation of the pump 41 and blower 56. In the operation of the apparatus the kettle, 14, may be filled and its contents brought to any desired temperature when the furnace, 10, is in lowered position. A further cooking of the contents of the kettle may be performed at a reduced pressure, and the rim of the kettle may be brought into engagement with the rim of the hood, 15, by raising the bracket 30. The clamps, 21, 22, will then be closed, a supply of cooling water delivered to the chamber of the drum 40, through the water supply pipe 44 and the vacuum pump 41 operated. Sight glasses 68, 69, fitted to the wall of the hood 15, serve for viewing the contents of the kettle when the kettle and hood are connected. Similarly a vacuum gage 70 and thermometer 71, fitted to the wall of the hood 15, and the latter having a stem 72 extending into the contents of the kettle, serve for indicating the conditions under which the cooking is proceeding.

When the cooking operation is completed, the clamps 21, 22, will be released, the bracket 30 lowered to separate the kettle 14 from the hood 15, and the kettle will be lifted from the furnace 10. To permit the separation of the kettle 14 from the hood 15, a relief valve 73 is fitted in the wall of the kettle. As shown, a cup 74 is formed about the relief valve 73 for collecting any liquid material which may be discharged through the valve.

I claim as my invention,

1. In a cooking device, in combination, a vertically movable furnace, a kettle supported by the furnace, a hood stationarily mounted above the furnace, the rims of the hood and kettle being constructed for sealed engagement when the furnace is in elevated position and vacuum creating means connected with the hood.

2. In a cooking device, in combination, a furnace, a hood supported over the furnace, one of said parts being vertically movable, a kettle removably seated on the furnace, the rims of the kettle and hood being constructed for sealed engagement when the kettle is seated on the furnace and the furnace and hood are positioned relatively near each other and vacuum creating means connected with the hood.

3. In a cooking device, in combination, a standard, a pair of vertically separated brackets mounted on the standard, one thereof being vertically movable, a furnace carried by the lower one of said brackets, a hood carried by the upper one of said brackets, a kettle removably seated on the furnace, the rims of the kettle and hood being constructed for sealed engagement when the movable bracket is located in its nearest position to the other bracket and vacuum creating means connected with the hood.

4. In a cooking device, in combination, a standard, three brackets mounted on the standard, two of the brackets being in vertical alinement and the lower one of said two brackets being vertically movable, a furnace carried by the said movable bracket, a hood carried by the said bracket which is above the movable bracket, a pump mounted on the other bracket, a condenser communicating with the pump and supported thereby, connection between the condenser and the hood, and a kettle removably seated on the furnace, the rims of the kettle and hood being constructed for sealed engagement when the movable bracket is elevated.

5. In a cooking device, in combination, a frame, a kettle and a hood therefor, the rims of said parts being constructed for sealed engagement, the kettle and hood being independently supported by the frame and one of said parts being vertically movable for separating it from the other, means for creating a vacuum in the chamber of the kettle when covered by the hood and means for heating the kettle.

PETER H. SCHLUETER.

Witnesses:
CHARLES B. GILLSON,
E. M. KLATCHER.